United States Patent
Inoue

(10) Patent No.: US 11,601,416 B2
(45) Date of Patent: Mar. 7, 2023

(54) INFORMATION PROCESSING APPARATUS, INFORMATION PROCESSING SYSTEM, AND NON-TRANSITORY COMPUTER READABLE MEDIUM

(71) Applicant: FUJIFILM Business Innovation Corp., Tokyo (JP)

(72) Inventor: Yuki Inoue, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 252 days.

(21) Appl. No.: 16/558,168

(22) Filed: Sep. 2, 2019

(65) Prior Publication Data

US 2020/0084198 A1 Mar. 12, 2020

(30) Foreign Application Priority Data

Sep. 10, 2018 (JP) .............................. JP2018-168949

(51) Int. Cl.
*H04L 9/40* (2022.01)
(52) U.S. Cl.
CPC .......... *H04L 63/083* (2013.01); *H04L 63/102* (2013.01)
(58) Field of Classification Search
CPC ... H04L 63/083; H04L 63/102; H04L 63/105; H04L 9/3226; H04W 12/069
See application file for complete search history.

(56) References Cited

U.S. PATENT DOCUMENTS

| 8,978,122 B1 * | 3/2015 | Zolfonoon | H04L 63/0815 726/8 |
| 9,313,230 B1 * | 4/2016 | Kruse | H04L 63/20 |
| 2007/0288280 A1 * | 12/2007 | Gilbert | H04L 63/20 705/80 |
| 2010/0125612 A1 * | 5/2010 | Amradkar | H04L 63/105 707/E17.014 |
| 2014/0090037 A1 * | 3/2014 | Singh | H04L 63/0815 726/8 |

(Continued)

FOREIGN PATENT DOCUMENTS

| JP | 2004070814 | 3/2004 |
| JP | 2011253342 | 12/2011 |

(Continued)

OTHER PUBLICATIONS

Sattarova Feruza Y et al.,"IT Security Review: Privacy, Protection, Access Control, Assurance and System Security," Apr. 2007, pp. 17-32. (Year: 2007).*

(Continued)

*Primary Examiner* — Luu T Pham
*Assistant Examiner* — Canh Le
(74) *Attorney, Agent, or Firm* — JCIPRNET

(57) ABSTRACT

An information processing apparatus includes an authenticator that authenticates a user so that the user accesses plural resources on a network, an acquirer that acquires conditions that are related to a strength of authentication information and are provided differently for the respective resources, and a controller that controls, when the user accesses one resource out of the plural resources, access to the one resource based on a condition related to the strength for the one resource and strength information related to the strength of the authentication information of the user that is used by the authenticator.

10 Claims, 11 Drawing Sheets

(56) References Cited

U.S. PATENT DOCUMENTS

| | | | | |
|---|---|---|---|---|
| 2015/0365396 A1* | 12/2015 | Dubey | ............... | G06F 21/31 |
| | | | | 713/183 |
| 2015/0373011 A1* | 12/2015 | Subramanya | ......... | G06F 21/31 |
| | | | | 726/9 |
| 2016/0050209 A1* | 2/2016 | Govande | ............ | H04W 12/06 |
| | | | | 726/7 |

FOREIGN PATENT DOCUMENTS

| | | |
|---|---|---|
| JP | 2013041514 | 2/2013 |
| JP | 2014-182738 | 9/2014 |

OTHER PUBLICATIONS

Guangsen Zhang et al., "Context-aware Dynamic Access Control for Pervasive Applications," 2004, pp. 1-6. (Year: 2004).*

"Office Action of Japan Counterpart Application" with English translation thereof, dated Apr. 26, 2022, p. 1-p. 7.

\* cited by examiner

FIG. 9A

| USER ID | PASSWORD (HASH VALUE) |
|---|---|
| USER I | f0c3c2aa81c32ce80991465364d66563 |
| USER II | 5609b06954154lb8c1bdaa4eccaa13c5 |
| USER III | 1ed48affa5c982d3e32aa8bdaac4717a |

| USER ID | PASSWORD LENGTH | DATE OF PASSWORD CHANGE | NUMBER OF UPPER-CASE LETTERS INCLUDED IN PASSWORD | NUMBER OF LOWER-CASE LETTERS INCLUDED IN PASSWORD | NUMBER OF NUMERICAL DIGITS INCLUDED IN PASSWORD | ⋮ |
|---|---|---|---|---|---|---|
| USER I | 8 | 12/31/2017 10:00 | 2 | 5 | 1 | ⋮ |
| USER II | 4 | 1/1/2018 11:00 | 0 | 2 | 2 | ⋮ |
| USER III | 12 | 2/1/2018 9:00 | 4 | 4 | 4 | ⋮ |

| DOCUMENT ID | TENANT ID |
|---|---|
| DOCUMENT D1 | TENANT A |
| DOCUMENT D2 | TENANT B |
| DOCUMENT D3 | TENANT C |

| TENANT ID | MINIMUM PASSWORD LENGTH | PASSWORD VALIDITY PERIOD | MINIMUM NUMBER OF UPPER-CASE LETTERS INCLUDED IN PASSWORD | MINIMUM NUMBER OF LOWER-CASE LETTERS INCLUDED IN PASSWORD | MINIMUM NUMBER OF NUMERICAL DIGITS INCLUDED IN PASSWORD |
|---|---|---|---|---|---|
| TENANT A | 6 | 3 MONTHS | 1 | 1 | 0 |
| TENANT B | 10 | INFINITY | 0 | 0 | 0 |
| TENANT C | 6 | 2 MONTHS | 1 | 1 | 1 |

| USER ID | PASSWORD LENGTH | DATE OF PASSWORD CHANGE | NUMBER OF UPPER-CASE LETTERS INCLUDED IN PASSWORD | NUMBER OF LOWER-CASE LETTERS INCLUDED IN PASSWORD | NUMBER OF NUMERICAL DIGITS INCLUDED IN PASSWORD | ... |
|---|---|---|---|---|---|---|
| USER I | 8 | 12/31/2017 10:00 | 2 | 5 | 1 | ... |
| USER II | 4 | 1/1/2018 11:00 | 0 | 2 | 2 | ... |
| USER III | 12 | 2/1/2018 9:00 | 4 | 4 | 4 | ... |

521

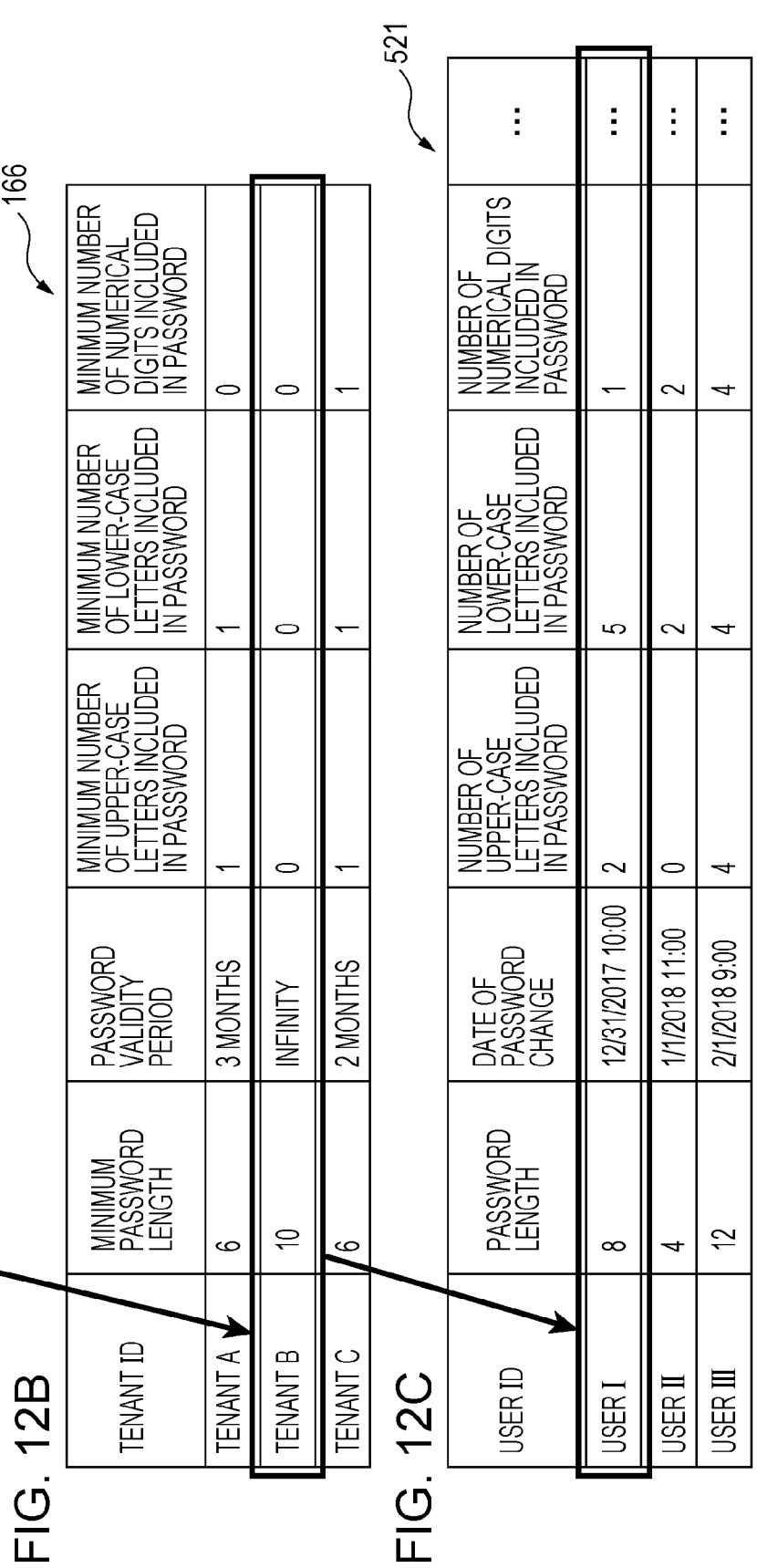

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-168949 filed Sep. 10, 2018.

BACKGROUND

(i) Technical Field

The present disclosure relates to an information processing apparatus, an information processing system, and a non-transitory computer readable medium.

(ii) Related Art

For example, Japanese Unexamined Patent Application Publication No. 2014-182738 describes an identifier management apparatus including a policy acquirer that acquires, from a connected system, an other-device policy that is a password policy of the system, and an inspector that inspects whether a password candidate input to a self-owned apparatus complies with the other-device policy and issues an error message when the password candidate does not comply with the other-device policy.

SUMMARY

Aspects of non-limiting embodiments of the present disclosure relate to the following circumstances. There is known a system in which a plurality of different resources on a network are made available by performing a single operation of user authentication processing. In this system, conditions related to the strength of authentication information may be defined for the respective resources. In this case, related art requires compliance with the strictest condition among the conditions defined for the plurality of resources. For example, if any one of the plurality of resources that is not frequently used has a strict condition related to the strength of authentication information, the user is required to make settings related to the strength of authentication information under the strict condition, with the result that the user's convenience decreases.

Aspects of non-limiting embodiments of the present disclosure also relate to improvement in the convenience of use of resources on a network by a user in a system in which a plurality of resources having different conditions related to the strength of authentication information are made available by performing a single operation of authentication processing for the authentication information.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus comprising an authenticator that authenticates a user so that the user accesses a plurality of resources on a network, an acquirer that acquires conditions that are related to a strength of authentication information and are provided differently for the respective resources, and a controller that controls, when the user accesses one resource out of the plurality of resources, access to the one resource based on a condition related to the strength for the one resource and strength information related to the strength of the authentication information of the user that is used by the authenticator.

BRIEF DESCRIPTION OF THE DRAWINGS

An exemplary embodiment of the present disclosure will be described in detail based on the following figures, wherein:

FIG. 3 illustrates an example of the hardware configuration of a computer that implements a tenant management server, a resource providing server, a client terminal, an access control server, and the like;

FIGS. 9A and 9B illustrate password information and strength information in a case in which passwords are set;

FIGS. 11A, 11B, and 11C illustrate a case in which the user requests access to a first document; and FIGS. 12A, 12B, and 12C illustrate a case in which the user requests access to a second document.

DETAILED DESCRIPTION

An exemplary embodiment of the present disclosure is described below in detail with reference to the accompanying drawings.

<Overall Configuration of Information Processing System 1>

Figure 1:
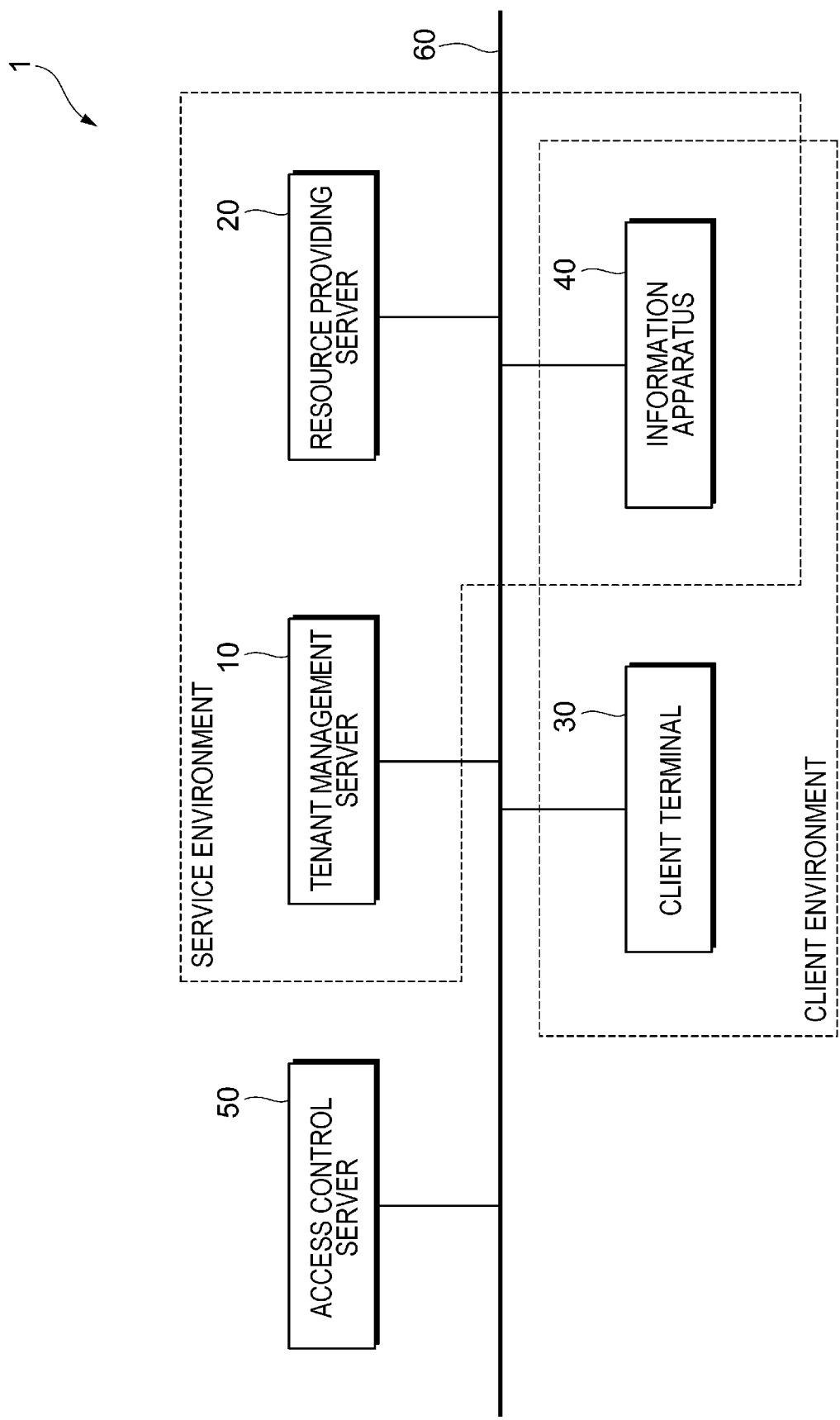
FIG. 1 illustrates the overall configuration of an information processing system of an exemplary embodiment.

FIG. 1 illustrates the overall configuration of an information processing system 1 of this exemplary embodiment.

As illustrated in FIG. 1, the information processing system 1 of this exemplary embodiment includes a tenant management server 10 (example of a manager) that manages users' authority to use resources on a network 60, a resource providing server 20 that provides a specific resource via the network, a client terminal 30 that uses a service provided by the resource providing server 20 via the tenant management server 10, an information apparatus 40 that provides a function for the users, and an access control server 50 (example of an information processing apparatus) that controls users' access to the resources. The apparatuses are connected together via the network 60.

As indicated by broken lines in FIG. 1, the tenant management server 10 and the resource providing server 20 configurate a service environment in which resources and services on the network 60 are provided and the client terminal 30 configurates a client environment in which the resources and services on the network 60 are used. Assuming that the function of the information apparatus 40 is a resource available on the network 60, the information apparatus 40 is included in the service environment from the viewpoint of using the function of the information apparatus 40 at the client terminal 30. Similarly to the client terminal 30, the information apparatus 40 may be an operation target apparatus that is directly operated by a user via a user interface of the information apparatus 40. From this viewpoint, the information apparatus 40 is included in the client environment.

The tenant management server 10 controls users' access to resources on the network 60 based on authority to use the resources.

For example, the resource on the network 60 refers to hardware, software, or data available for the users via the network. If a service to be provided via the network (web service or cloud service) is used, hardware or software that provides the service is used. In this exemplary embodiment, the resource on the network 60 includes the service to be provided via the network. If the information apparatus 40 is operated via the network 60, the function of the information apparatus 40 is included in the resource available at the client terminal 30 via the network 60.

Details of a tenant and authority of a user are described later.

The resource providing server 20 includes a so-called service provider. The service provider refers to a server that provides a service via the network (web service or cloud service). For example, the service to be provided by the resource providing server 20 as a resource is implemented by an application program to be used via the network 60 (web application) or processing to be performed by using an application program provided at the back end. The service to be provided by the resource providing server 20 includes provision of hardware resources such as a storage and a processor and provision of software (software package).

Examples of the client terminal 30 include a personal computer, portable information terminals such as a tablet terminal and a smartphone, and other information terminals to be connected to the tenant management server 10 via the network 60 to use the resources on the network 60. As described above, the use of the resources on the network 60 includes not only the use of the service, the hardware resource, or the software package provided by the resource providing server 20 but also the use of the function of the information apparatus 40 via the network 60.

The information apparatus 40 is an information processing apparatus that is used by a user and is connectable to the network 60. The information apparatus 40 differs from the client terminal 30 and is managed by the tenant management server 10. The information apparatus 40 has a user interface and may be an operation target apparatus that is directly operated by the user similarly to the client terminal 30.

For example, the information apparatus 40 is implemented by office equipment having a communication function for establishing connection to the network 60. Specifically, the information apparatus 40 is a copying machine, a scanner, a facsimile transmitter/receiver, a printer, or a multifunction peripheral having those functions integrally. The information apparatus 40 may be an information terminal such as a personal computer or a tablet terminal that is shared in an office and is not allocated to each user.

The function of the information apparatus 40 may be used at the client terminal 30 as a resource on the network 60 that is managed and provided by the tenant management server 10. The information apparatus 40 may be connected to the client terminal 30 via a LAN different from the network 60.

The access control server 50 is a personal authentication server for users. The access control server 50 may use a function of an identity provider (IdP). When a user accesses a plurality of resources on the network, the access control server 50 of this exemplary embodiment authenticates the user. Based on the user authentication, the access control server 50 controls the user's access to the resources. In particular, the access control server 50 of this exemplary embodiment allows the user to access a plurality of resources and tenants (described later) by performing a single operation of user authentication instead of authenticating the user when the user accesses each of the plurality of resources and tenants.

The network 60 is a communication network for use in data communication among the apparatuses that configurate the information processing system 1. The type of the network 60 is not particularly limited as long as data is transmissible and receivable. Examples of the network 60 include the Internet, a local area network (LAN), and a wide area network (WAN). A communication line for use in data communication may be wired or wireless. The apparatuses may be connected together via a plurality of networks or communication lines. As described above, the client terminal 30 and the information apparatus 40 that configurate a user environment in the information processing system 1 may be connected together via a LAN different from the network 60. In this case, for example, a network connecting the client environment to the service environment may be constructed by connecting, to the network 60, the LAN (router of the LAN) connecting the client terminal 30 and the information apparatus 40 together.

<Management Function of Information Processing System>

Figure 2:
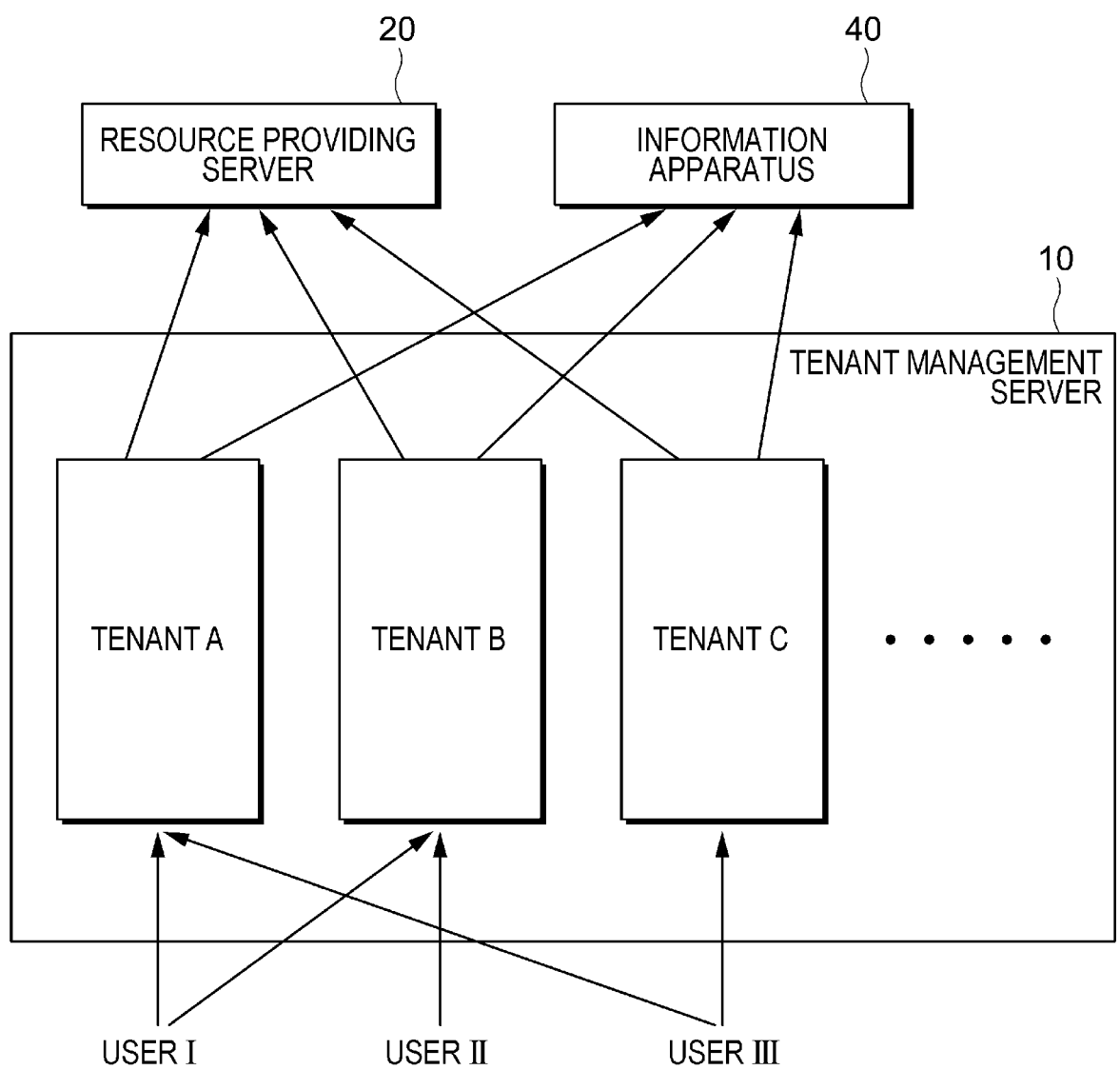
FIG. 2 illustrates a multi-tenant management method in the information processing system of the exemplary embodiment.

FIG. 2 illustrates a multi-tenant management method in the information processing system of this exemplary embodiment.

In this exemplary embodiment, the tenant management server 10 manages authority to use the resources on the network 60 by the multi-tenant management method. The tenant refers to an element to be managed in relation to the use of the resources on the network 60. In the multi-tenant management method, a plurality of tenants are set and the authority is managed for each tenant. Access to the resource is controlled in accordance with a license set in each tenant.

For example, a license for using the service provided by the resource providing server 20 (web service or cloud service), a license for using the software package available via the resource providing server 20, or a license for using the function of the information apparatus 40 is set in each tenant. The license refers to authority provided in the tenant to use the service or the software package. The license is provided in the tenant by a provider of the cloud service or a vendor of the software package. Terms defined in the license provide for a maximum number of users and the like.

One or a plurality of users belong to each tenant. In practical use, the tenant may be set in association with various types of organization such as a company, a department in a company, and other groups depending on a contract for use or the like. With this setting, various licenses described above may be managed and the use of the resources on the network 60 may be controlled for each organization associated with the tenant. That is, the user belonging to the tenant (hereinafter referred to as a member user) and the license set in the tenant are managed in the tenant. The organization for which tenants are set may use the resources on the network 60 in the respective tenants in a similar way to a case of using dedicated resources provided in separate systems.

A tenant administrator is set in each tenant. The tenant administrator assigns a role to a user belonging to the tenant. The role refers to authority to use a license assigned to the user.

The tenant administrator refers to a person who permits a user to belong to the tenant, sets a role for the user belonging to the tenant, and manages the member user and the role assigned to the member user. The tenant administrator is also a person who sets a license in the tenant.

The user belonging to the tenant refers to a user registered in association with the tenant and permitted to use the license set in the tenant in accordance with the assigned role.

The role of each user is defined within a range of the license set in the tenant. For example, if the number of licenses set in the tenant is 10 regarding use of a certain software package, up to ten member users may be assigned roles for using the software package. In other words, even if more than ten users belong to the tenant, roles may not be assigned to member users in excess of 10. If service contents available with the license set in the tenant are limited regarding use of a certain cloud service, roles may be assigned to the member user only for licensed service contents. Roles related to the limited service contents may not be assigned to the member user.

<Hardware Configuration of Each Apparatus>

Figure 3:
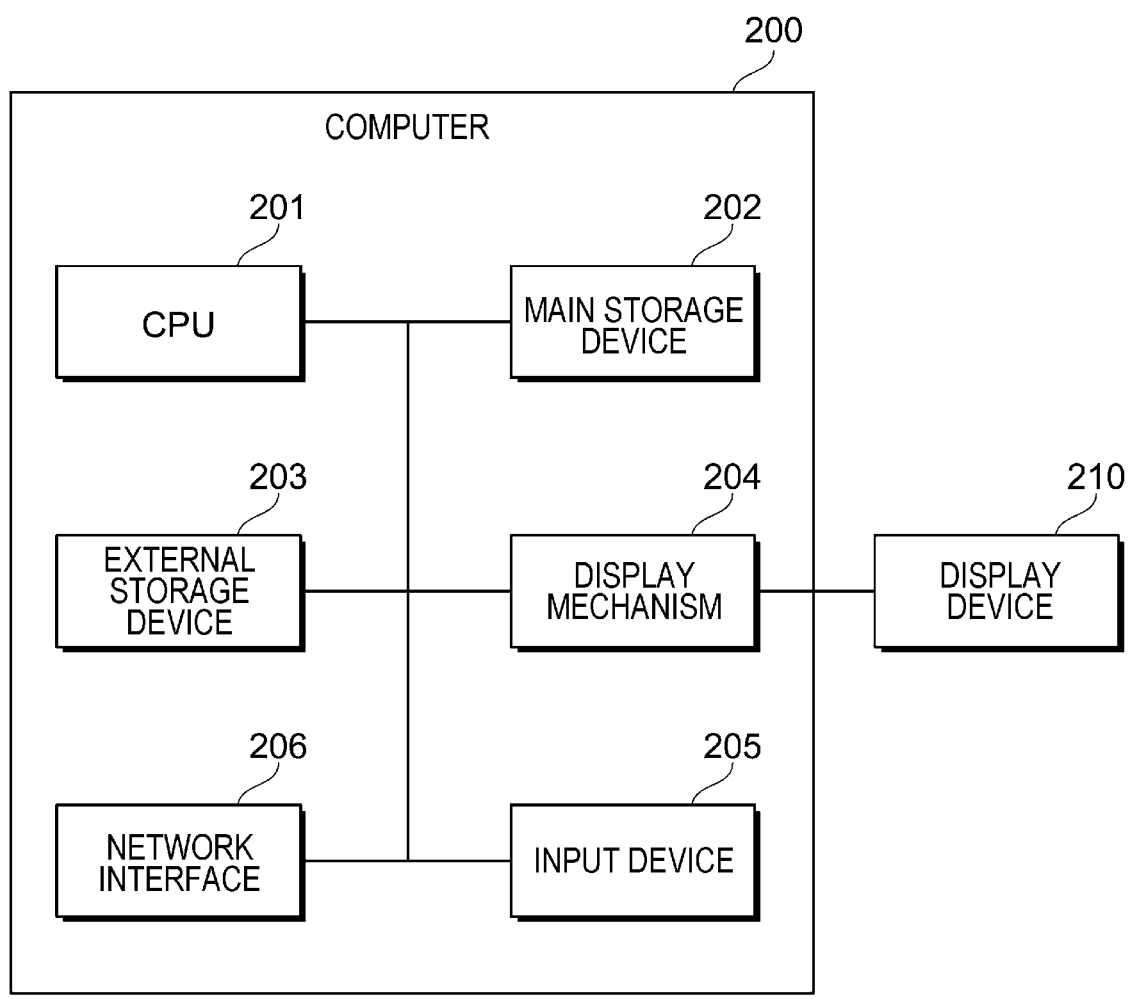

FIG. 3 illustrates an example of the hardware configuration of a computer that implements the tenant management server 10, the resource providing server 20, the client terminal 30, the access control server 50, and the like.

As illustrated in FIG. 3, a computer 200 includes a central processing unit (CPU) 201 serving as a calculator, and a main storage device (main memory) 202 and an external storage device 203 each serving as a memory. The CPU 201 executes a program stored in the external storage device 203 by reading the program in the main storage device 202. Examples of the main storage device 202 to be used include a random access memory (RAM). Examples of the external storage device 203 to be used include a magnetic disk drive and a solid state drive (SSD). The computer 200 further includes a display mechanism 204 for display output to a display device (display) 210, and an input device 205 to be used by an operator of the computer 200 to perform an input operation. Examples of the input device 205 to be used include a keyboard and a mouse. The computer 200 further includes a network interface 206 for connection to the network 60.

The configuration of the computer 200 illustrated in FIG. 3 is merely an example and the configuration of the computer 200 is not limited to the example of the configuration of FIG. 3. For example, the computer 200 may include, as the storage device, a non-volatile memory such as a flash memory or a read only memory (ROM). The specific configuration may differ depending on the application of the tenant management server 10, the resource providing server 20, the client terminal 30, or the like. For example, if the client terminal 30 is implemented by a tablet terminal, a touch panel that is a combination of a touch sensor and a liquid crystal display is used as the input device 205. Each of the tenant management server 10 and the resource providing server 20 may be configured by using the computer 200 alone as illustrated in FIG. 3 or may be implemented through distributed processing by using a plurality of computers 200.

<Functional Configuration of Tenant Management Server>

Figure 4:
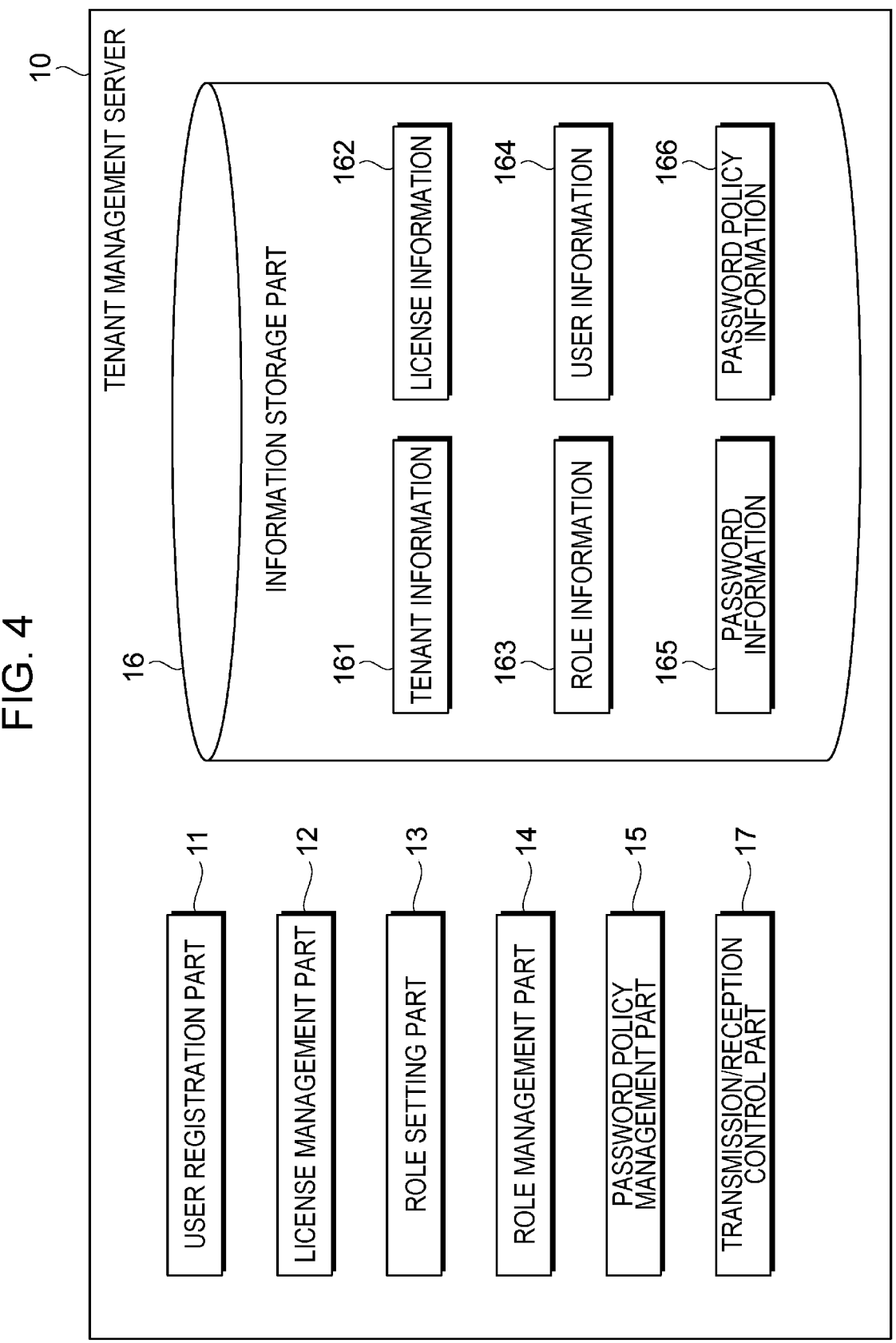
FIG. 4 illustrates the functional configuration of the tenant management server of the exemplary embodiment.

FIG. 4 illustrates the functional configuration of the tenant management server 10 of this exemplary embodiment.

As illustrated in FIG. 4, the tenant management server 10 includes a user registration part 11 that registers member users of tenants (examples of an element), and a license management part 12 that manages licenses set in the tenants in association with the tenants. The tenant management server 10 further includes a role setting part 13 that sets, for the users belonging to the tenants, roles for using the licenses set in the tenants, and a role management part 14 that manages information related to the roles. The tenant management server 10 further includes a password policy management part 15 that manages password policies (examples of a condition related to the strength of authentication information), an information storage part 16 that stores information for use in tenant management, and a transmission/reception control part 17 for communication with the resource providing server 20, the client terminal 30, and the information apparatus 40. The information storage part 16 stores pieces of information on the member users, the tenants, the licenses, the roles, and the like while those pieces of information are variously associated with each other. Details of those pieces of information are described later.

For example, the functions of the user registration part 11, the license management part 12, the role setting part 13, the role management part 14, the password policy management part 15, and the transmission/reception control part 17 are implemented such that the CPU 201 executes the program in the computer 200 illustrated in FIG. 3. For example, the information storage part 16 is implemented by the main storage device 202 and the external storage device 203 in the computer 200 illustrated in FIG. 3.

The user registration part 11 sets and registers a member user in each tenant. For example, the user registration part 11 manages information indicating which tenant each user belongs to. The user registration part 11 also manages password information (example of the authentication information) set for each member user.

The user registration part 11 stores received information on a member user and information that associates the user and a tenant to which the user belongs as user information 164 in the information storage part 16. The user registration part 11 associates the received information on the user with password information and stores those pieces of information as password information in the information storage part 16. The user registration part 11 of this exemplary embodiment stores a password received from the user in an undecryptable state by encrypting the password or irreversibly converting the password into a hash value or the like.

When a user logs in, the user registration part 11 of this exemplary embodiment compares a user's password received by the access control server 50 via the client terminal 30 with the password information stored in the information storage part 16. In this exemplary embodiment, the user registration part 11 determines whether information obtained by irreversibly converting the password received when the user logs in matches the stored information obtained by irreversibly converting the preset user's password. When both pieces of information match each other, the user registration part 11 sends, to the access control server 50, information indicating that the login is permitted.

The login refers to an operation for authenticating a user belonging to a tenant by using the user information and the password information that correspond to preset account information in order to use a resource on the network 60 under the management of the tenant management server 10.

The license management part 12 defines a role for allowing a user belonging to each tenant to use a license in the tenant. The information storage part 16 stores information on the license as license information 162 and also stores information on the role as role information 163. Examples of the license to be managed by the license management part 12 include a license for using the service provided by the resource providing server 20 (web service or cloud service), a license for using the software package provided by the resource providing server 20, and a license for using the function of the information apparatus 40.

The role setting part 13 sets a role within a range of the license managed by the license management part 12. If the role needs to be set beyond the range of the license set in the tenant, it is necessary to change the license setting made by the license management part 12. Examples of the case in which the role needs to be set beyond the range of the license set in the tenant include a case in which the number of necessary licenses has become larger than the number of set licenses due to an increase in the number of member users and a case in which a license having different contents from the contents of the set licenses is necessary.

In the role management part 14, examples of information related to roles include information on new role setting (assignment of a role to a member user), information on deletion of a role, information for identifying a tenant in which a role is used (tenant ID), information for identifying a member user who uses a role (user ID), information on an operation performed when a role is used, and information on a date and time when a role is used.

As described above, the tenant management server 10 uses the function of the license management part 12 to control access to a resource on the network 60 from a user belonging to a tenant based on authority set in the tenant to use the resource. Further, the tenant management server 10 uses the functions of the user registration part 11, the license management part 12, the role setting part 13, and the role management part 14 to register and manage a user who has access to a resource on the network 60.

The password policy management part 15 manages a password policy set in each tenant. The password policy management part 15 stores the password policy as password policy information in the information storage part 16.

The strength of a password is low when the password is easy to guess and is high when the password is difficult to guess. The password policy specifies a condition that a user should comply with when setting a password, thereby defining the strength of the password. For example, the password policy defines a higher strength of a password to be set as the condition is more complex and stricter. The password policy defines a lower strength of a password to be set as the condition is simpler and looser.

For example, the strength of a password is defined based on the number of letters or numerical digits that construct the password (hereinafter referred to as a password length), a password validity period, a minimum number of upper-case letters included in the password, a minimum number of lower-case letters included in the password, a minimum number of numerical digits included in the password, and the number of times the password is permitted to overlap a previously set password. For example, the strength of the password is higher when the password is long than when the password is short.

In this exemplary embodiment, different password policies are set in a plurality of tenants. The password policy management part 15 stores a password policy of a tenant that requires a password having a relatively high strength and a password policy of a tenant that requires a password having a relatively low strength.

The information storage part 16 stores tenant information 161, the license information 162, the role information 163, the user information 164, password information 165, and password policy information 166.

The tenant information 161 includes identification information of each tenant set as a management element of the tenant management server 10 (tenant ID) and attribute information of each tenant (tenant attribute).

The license information 162 is created in association with a tenant in which a license is set and includes identification information of each license (license ID) and attribute information of each license (license attribute).

The role information 163 is created in association with a license in which a role is defined and includes identification information of each role (role ID).

The user information 164 is created in association with a tenant to which a user belongs and includes identification information of each member user (user ID) and attribute information of each member user (user attribute).

The password information 165 is created in association with each member user and includes information on a password of each user. As described above, the password information of this exemplary embodiment is obtained by converting a password set by a user into a hash value.

In this exemplary embodiment, the password policy information 166 is set in association with each tenant. As described above, the password policy information includes conditions such as a minimum password length, a password validity period, a minimum number of upper-case letters included in the password, a minimum number of lower-case letters included in the password, and a minimum number of numerical digits included in the password.

For example, the transmission/reception control part 17 controls the network interface 206 illustrated in FIG. 3 to transmit or receive a command or data between the tenant management server 10 and each of the resource providing server 20, the client terminal 30, and the information apparatus 40 via the network 60.

<Functional Configuration of Resource Providing Server>

Figure 5:
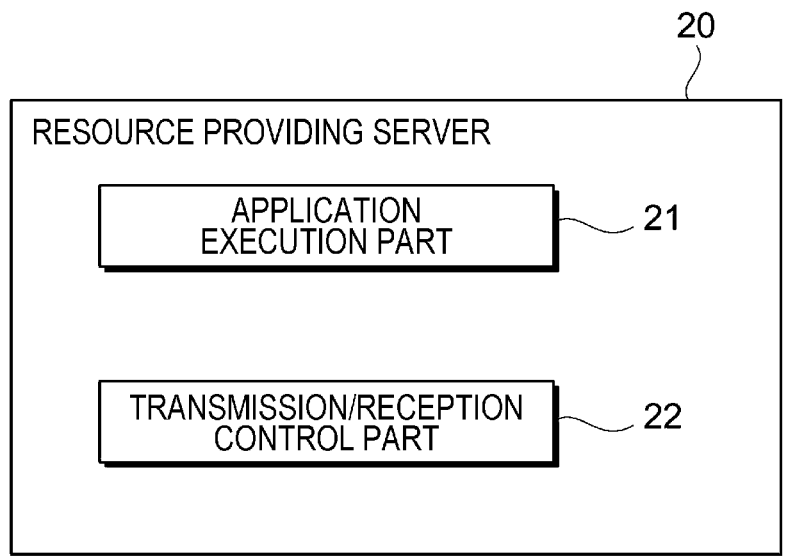
FIG. 5 illustrates the functional configuration of the resource providing server of the exemplary embodiment.

FIG. 5 illustrates the functional configuration of the resource providing server 20 of this exemplary embodiment.

As illustrated in FIG. 5, the resource providing server 20 includes an application execution part 21 and a transmission/reception control part 22. For example, the functions of the application execution part 21 and the transmission/reception control part 22 are implemented such that the CPU 201 executes the program in the computer 200 illustrated in FIG. 3.

The application execution part 21 is an executor that executes an application program that implements processing related to provision of a resource by the resource providing server 20. For example, if the resource providing server 20 is a service provider, the application execution part 21 executes processing related to a service (web service or cloud service). If the resource providing server 20 is a server that provides a software package, the application execution part 21 implements a function as a license management system (LMS) server that manages a license for using the software package. The LMS server refers to a server that checks the validity of a license of a software package and gives permission for use.

The transmission/reception control part 22 is a communicator for communication with the tenant management server 10, the client terminal 30, and the information apparatus 40. For example, the transmission/reception control part 22 controls the network interface 206 illustrated in FIG. 3 to transmit or receive a command or data between the resource providing server 20 and each of the tenant management server 10, the client terminal 30, and the information apparatus 40 via the network 60.

<Functional Configuration of Client Terminal>

Figure 6:
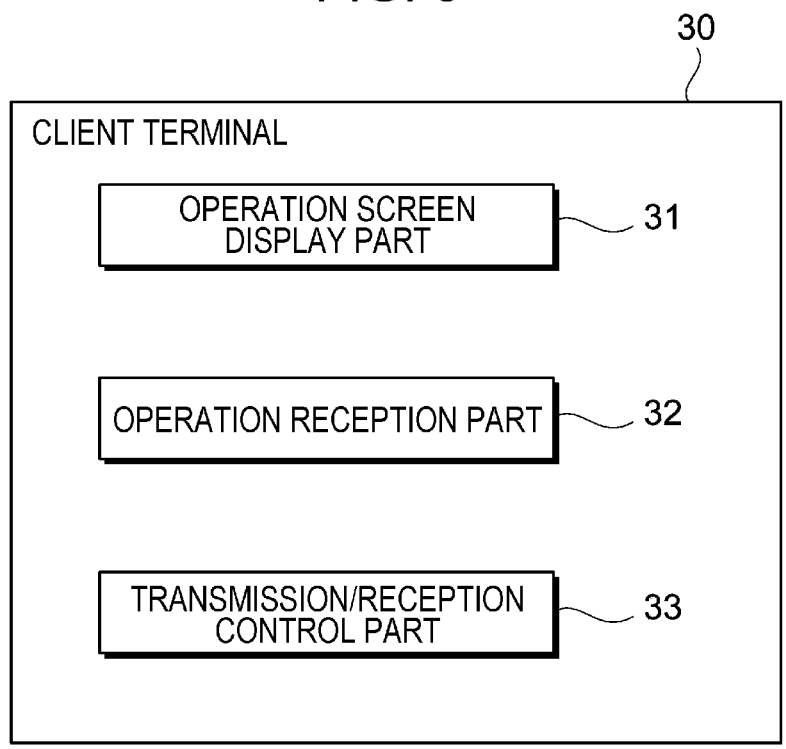
FIG. 6 illustrates the functional configuration of the client terminal of the exemplary embodiment.

FIG. 6 illustrates the functional configuration of the client terminal 30.

As illustrated in FIG. 6, the client terminal 30 includes an operation screen display part 31, an operation reception part 32, and a transmission/reception control part 33. For example, the functions of the operation screen display part 31, the operation reception part 32, and the transmission/reception control part 33 are implemented such that the CPU 201 executes the program in the computer 200 illustrated in FIG. 3.

The operation screen display part 31 generates and displays an operation screen for using the service or the software package provided by the resource providing server 20, the function of the information apparatus 40, or the like. For example, the operation screen display part 31 controls the display mechanism 204 illustrated in FIG. 3 to display the operation screen on the display device 210. The operation reception part 32 receives an operation performed on the operation screen as an operation for using the service, the software package, the function of the information apparatus 40, or the like. For example, the operation reception part 32 receives an operation performed by using the input device 205 illustrated in FIG. 3. For example, if the service, the software package, the function of the information apparatus 40, or the like is provided by using the World Wide Web (WWW), the functions of the operation screen display part 31 and the operation reception part 32 are implemented by a web browser.

The transmission/reception control part 33 is a communicator for communication with the tenant management server 10, the resource providing server 20, and the information apparatus 40. For example, the transmission/reception control part 33 controls the network interface 206 illustrated in FIG. 3 to transmit or receive a command or data between the client terminal 30 and each of the tenant management server 10, the resource providing server 20, and the information apparatus 40 via the network 60.

<Functional Configuration of Access Control Server 50>

Figure 7:
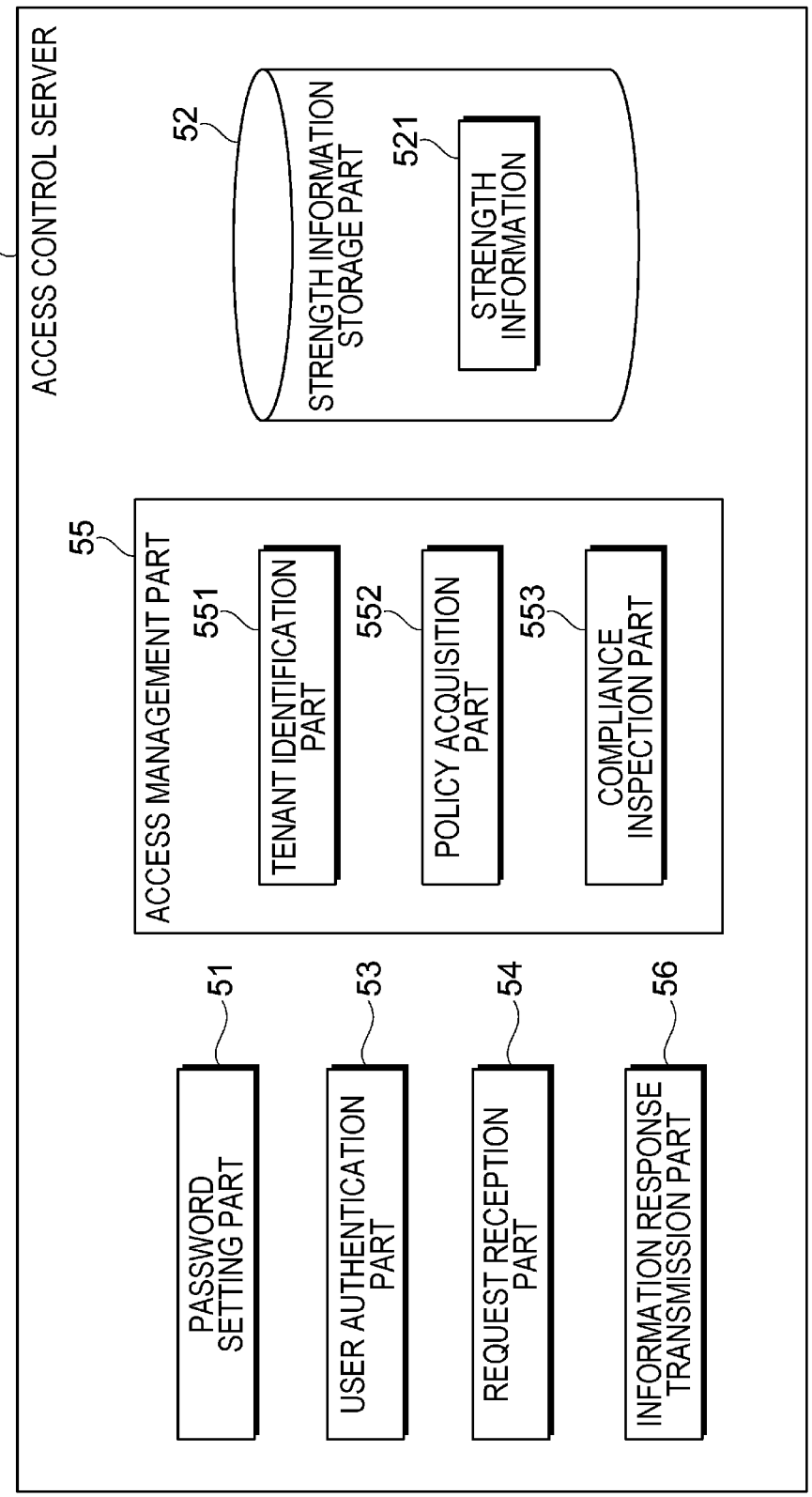
FIG. 7 is a functional block diagram of the access control server of the exemplary embodiment.

FIG. 7 is a functional block diagram of the access control server 50 of this exemplary embodiment.

The access control server 50 includes a password setting part 51 that performs processing for setting a password by a user, a strength information storage part 52 (example of a strength information memory) that stores strength information related to the strength of a password, and a user authentication part 53 (example of an authenticator) that authenticates a user. The access control server 50 further includes a request reception part 54 that receives a request to access a resource from a user, an access management part 55 that manages user's access to a resource, and an information response transmission part 56 (example of a controller) that causes a resource to be transmitted to the client terminal 30.

For example, the functions of the password setting part 51, the request reception part 54, the information response transmission part 56, and the access management part 55 are implemented such that the CPU 201 executes the program in the computer 200 illustrated in FIG. 3. For example, the function of the strength information storage part 52 is implemented by the external storage device 203 in the computer 200 illustrated in FIG. 3.

(Password Setting Part 51)

When a user newly sets or changes a password, the password setting part 51 performs processing for setting the password. The password setting part 51 transmits the password to be set by the user to the user registration part 11 of the tenant management server 10. The password setting part 51 extracts, from the password, strength information related to the strength of the password. Then, the password setting part 51 sends the extracted strength information to the strength information storage part 52.

The strength information of a password is extracted from the password from the viewpoint of a password policy. That is, the strength information of a password is extracted from the password when comparison is made as to whether the password satisfies each of the conditions that constitute the password policy. Specifically, the strength information of a password is information on the length of the password set by a user, a date of password setting or change, the number of upper-case letters included in the password, the number of lower-case letters included in the password, and the number of numerical digits included in the password.

(Strength Information Storage Part 52)

The strength information storage part 52 stores strength information 521 of a password set by a user in the password setting part 51. The strength information storage part 52 stores the strength information 521 of a password in association with each user.

For example, the access control server 50 of this exemplary embodiment does not store a password itself from the viewpoint of security. However, the access control server 50 is not limited to the avoidance of storage of a password itself but may store a password itself.

(User Authentication Part 53)

When a user logs into the information processing system 1, the user authentication part 53 authenticates the user. The user authentication part 53 receives user information and a password from the user at the client terminal 30. Then, the user authentication part 53 sends the received password to the user registration part 11 of the tenant management server 10 in association with the user. When a notification that there is a match for the user's password is received from the user registration part 11, the user authentication part 53 permits the user to log in.

(Request Reception Part 54)

The request reception part 54 functions when a user accesses a resource. The request reception part 54 receives a request to access the resource from the user. The request reception part 54 sends, to the access management part 55, user information and request information for identifying the resource that the user desires to access.

(Access Management Part 55)

The access management part 55 of this exemplary embodiment includes a tenant identification part 551 that identifies a tenant to which a resource belongs based on desire information, and a policy acquisition part 552 that acquires a password policy of each tenant. The access management part 55 further includes a compliance inspection part 553 that performs compliance inspection for inspecting whether a password of a user who desires to access a resource of a certain tenant complies with a password policy of the tenant.

The tenant identification part 551 identifies a tenant to which a resource that a user desires to access belongs. The tenant identification part 551 identifies the tenant to which the resource belongs by referring to the tenant information

161 in the information storage part 16. Then, the tenant identification part 551 sends information on the identified tenant to the policy acquisition part 552.

The policy acquisition part 552 (example of an acquirer) acquires password policy information of a tenant identified by the tenant identification part 551. In this exemplary embodiment, the policy acquisition part 552 acquires the password policy information of the identified tenant by referring to the password policy information 166 in the information storage part 16. Then, the policy acquisition part 552 sends the acquired password policy information to the compliance inspection part 553.

The policy acquisition part 552 may acquire password policy information of a specific tenant when a user requests access to a resource of the tenant. The policy acquisition part 552 may prestore password policy information by acquiring a password policy of each tenant from the tenant management server 10 at an arbitrary timing other than the timing when a user requests access to a resource of a specific tenant.

The compliance inspection part 553 inspects whether strength information of a password set by a user complies with a password policy acquired from the policy acquisition part 552. When the strength information complies with the password policy, the compliance inspection part 553 sends, to the information response transmission part 56, information indicating that the strength information complies with the password policy. When the strength information does not comply with the password policy, the compliance inspection part 553 sends, to the information response transmission part 56, information indicating that the strength information does not comply with the password policy.

(Information Response Transmission Part 56)

Based on information acquired from the compliance inspection part 553, the information response transmission part 56 provides a resource for a user or notifies the user of error information indicating that the provision of the resource is not permitted.

When information indicating that strength information complies with a password policy is received from the compliance inspection part 553, the information response transmission part 56 controls the transmission/reception control part 17 of the tenant management server 10 to provide a resource requested by a user to the client terminal 30.

When information indicating that strength information does not comply with a password policy is received from the compliance inspection part 553, the information response transmission part 56 transmits error information to the client terminal 30. The error information includes contents for notifying a user that the user is not permitted to access a resource requested by the user because a user's password does not satisfy the password policy.

When strength information of a user's password does not satisfy a password policy of a tenant to which a resource belongs, the user may be notified of error information indicating details of the password policy. More specifically, the error information includes details of conditions of the password policy that are related to the strength. In this case, the user may set a password again in the password setting part 51 in consideration of the notification of the password policy. In this case, the information response transmission part 56 functions as an example of a notifier.

Detailed description is made of an operation of the information processing system 1 of this exemplary embodiment that is configured as described above.

Figure 8:
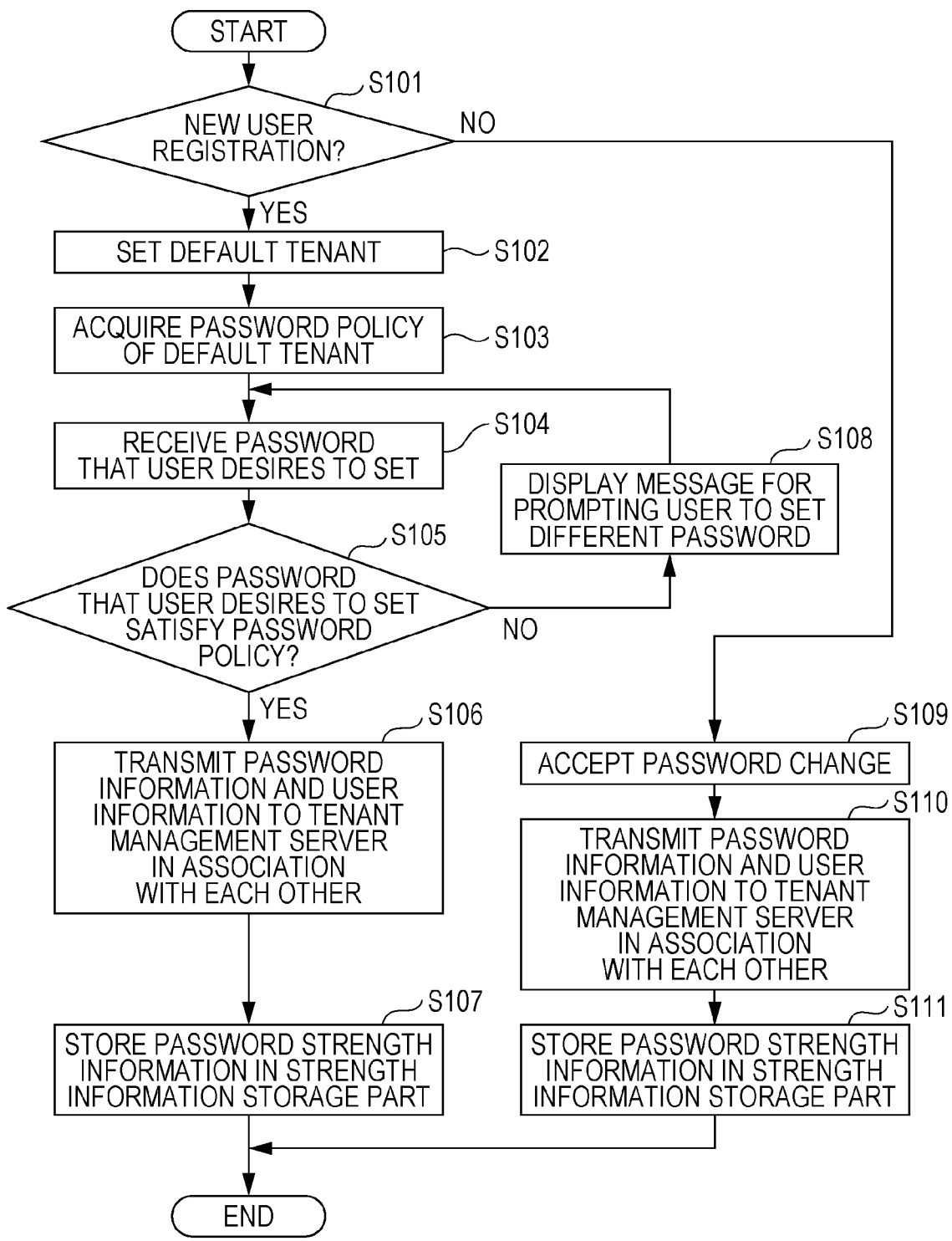
FIG. 8 is a flowchart for password setting in the information processing system of the exemplary embodiment.

FIG. 8 is a flowchart for password setting in the information processing system 1 of this exemplary embodiment.

As illustrated in FIG. 8, it is determined in the information processing system 1 whether a new user uses the information processing system 1 (Step S101). When a new user is registered ("YES" in Step S101), any one tenant managed by the tenant management server 10 is set as a default tenant (Step S102).

In the information processing system 1 of this exemplary embodiment, the user is supposed to belong to at least one tenant. In this exemplary embodiment, for example, a tenant that meets a predetermined condition, such as a company where the user works or a department to which the user belongs, is set as the user's default tenant.

Then, the access control server 50 acquires a password policy of the default tenant (Step S103). The access control server 50 receives, from the user, a password that the user desires to set (Step S104). Then, the access control server 50 determines whether the password that the user desires to set satisfies the password policy of the default tenant (Step S105). When the password satisfies the password policy ("YES" in Step S105), the access control server 50 sends user information and password information to the tenant management server 10 while associating the password information with the user information (Step S106).

The access control server 50 identifies strength information based on the password and stores the strength information of the password in the strength information storage part 52 in association with the user (Step S107).

When the password that the user desires to set does not satisfy the password policy of the default tenant ("NO" in Step S105), the access control server 50 displays a message for prompting the user to set a different password (Step S108) and returns to Step S104. When a password that satisfies the password policy of the default tenant is set after the return to Step S104, the access control server 50 proceeds to Steps S106 and S107.

When the user is not a new user ("NO" in Step S101), the access control server 50 accepts the setting as password change (Step S109). Then, the access control server 50 sends user information and password information to the tenant management server 10 in association with each other (Step S110).

The access control server 50 stores strength information of the password in the strength information storage part 52 in association with the user information (Step S111). The access control server 50 does not store the password itself similarly to the case of new user registration.

FIGS. 9A and 9B illustrate password information and strength information in a case in which passwords are set.

Description is made of specific examples of the password information stored in the information storage part 16 and the strength information stored in the strength information storage part 52 in the password setting performed as described above.

As illustrated in FIG. 9A, the information storage part 16 stores, as the password information 165, a hash value obtained by converting a password set by, for example, a user I based on a hash function in association with the user I. Similarly, the information storage part 16 stores hash values obtained by converting passwords of a user II and a user III as other users.

As illustrated in FIG. 9B, the strength information storage part 52 stores, as the strength information 521, strength information of the password set by the user I in association with the user I. In the example illustrated in FIG. 9B, strength information indicating that the password length is "8", the date of password change is "Dec. 31, 2017 10:00", the number of upper-case letters included in the password is "2", the number of lower-case letters included in the password is "5", and the number of numerical digits included in the password is "1" is stored in association with the user I. Similarly, the strength information storage part 52 stores pieces of strength information of the passwords set by the user II and the user III as other users.

Next, detailed description is made of an operation to be performed when a user accesses a resource provided by the resource providing server 20 or the information apparatus 40 at the client terminal 30.

Figure 10:
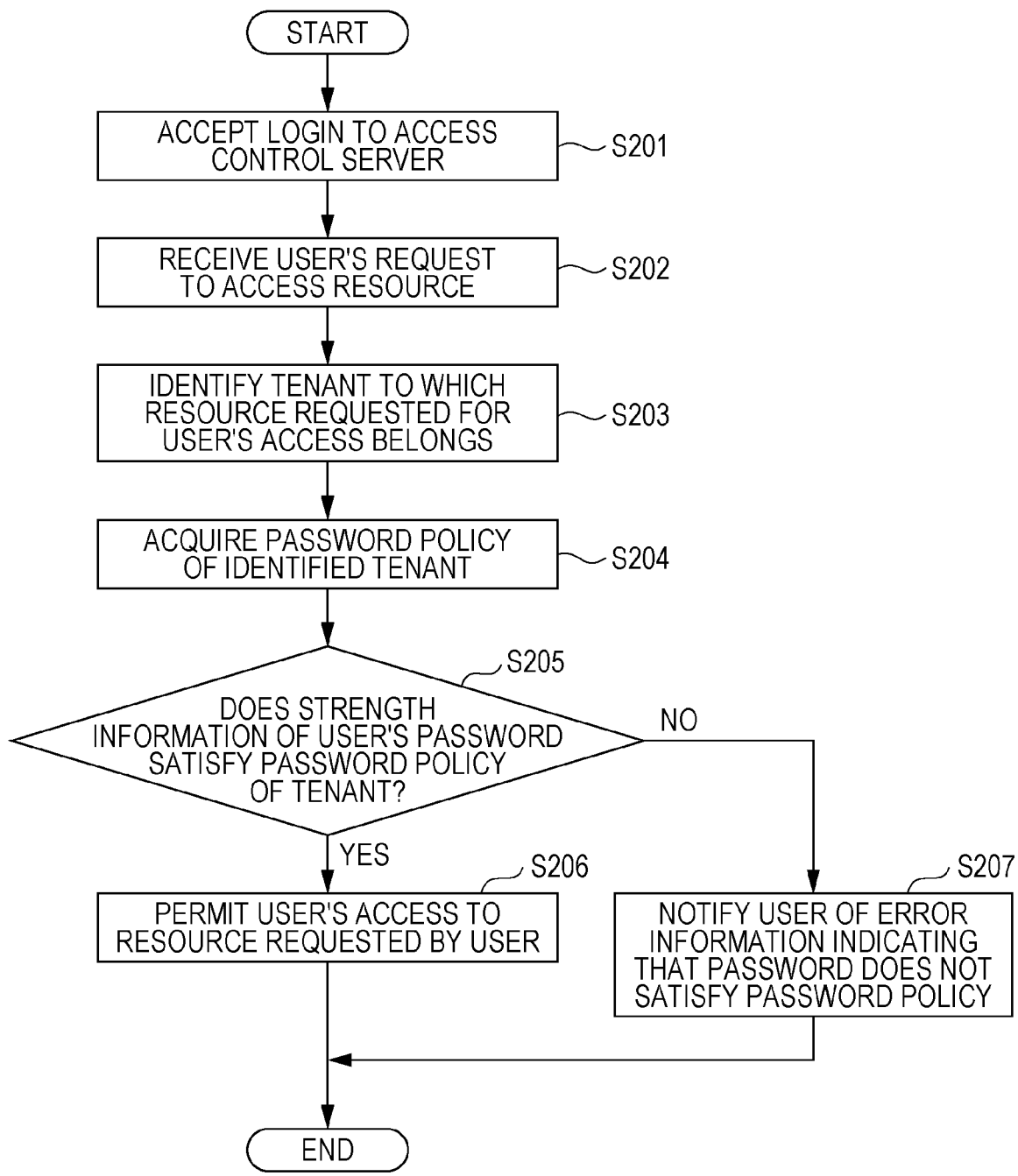
FIG. 10 is a flowchart for user's access to a resource in the exemplary embodiment.

FIG. 10 is a flowchart for user's access to a resource in this exemplary embodiment.

As illustrated in FIG. 10, the access control server 50 accepts user's login performed by using user information and password information (Step 201).

Then, the access control server 50 receives, from the user, a request to access a resource provided by the resource providing server 20 or the information apparatus 40 (Step 202). The user's request to access the resource is made in the request reception part 54.

As illustrated in FIG. 10, the access control server 50 accepts user's login performed by using user information and password information (Step S201).

Then, the access control server 50 receives, from the user, a request to access a resource provided by the resource providing server 20 or the information apparatus 40 (Step S202). The user's request to access the resource is made in the request reception part 54.

Then, the tenant identification part 551 identifies a tenant to which the resource requested for the user' access belongs (Step S203). Then, the policy acquisition part 552 acquires a password policy of the identified tenant (Step S204). Then, the compliance inspection part 553 determines whether strength information of the user's password satisfies the password policy of the identified tenant (Step S205).

When the strength information satisfies the password policy ("YES" in Step S205), the user is permitted to access the resource requested by the user (Step S206).

When the strength information does not satisfy the password policy ("NO" in Step S205), the user is notified of error information indicating that the user's login password does not satisfy the password policy (Step S207).

The user notified of the error information attempts to access the desired resource again by changing the password to a password that satisfies the password policy of the desired resource.

As described above, when a user accesses a resource in the information processing system 1 of this exemplary embodiment, the access to the resource is controlled by determining whether a password satisfies a password policy of a tenant to which the resource belongs. When a password is set in the information processing system 1 of this exemplary embodiment, it is not necessary to preset a password that satisfies password policies of all tenants.

Next, detailed description is made of exemplary cases in which the user I accesses a resource that is a document D1 and in which the user I accesses a resource that is a document D2.

The user I sets a password as in the specific example described with reference to FIGS. 9A and 9B.

FIGS. 11A, 11B, and 11C illustrate the case in which the user I requests access to the document D1.

In the example illustrated in FIGS. 11A, 11B, and 11C, the user I requests access to "DOCUMENT D1" as a document ID. As illustrated in FIG. 11A, the document D1 is identified as belonging to a tenant A based on the tenant information 161. In this example, it is assumed that the user I requests access to the document D1 on Feb. 1, 2018.

The user I belongs to the tenant A and has authority to access the document D1.

In this example, reference is made to the password policy information 166 for the tenant A as illustrated in FIG. 11B. The password policy information of the tenant A indicates that the minimum password length is "6", the password validity period is "3 months", the minimum number of upper-case letters included in the password is "1", the minimum number of lower-case letters included in the password is "1", and the minimum number of numerical digits included in the password is "0".

As illustrated in FIG. 11C, the strength information 521 of the password of the user I indicates that the password length is "8", the date of password change is "about 1 month ago", the number of upper-case letters included in the password is "2", the number of lower-case letters included in the password is "5", and the number of numerical digits included in the password is "1". That is, the strength information 521 of the password of the user I satisfies the password policy information 166 of the tenant A.

In this example, the user I is permitted to access the document D1 and the document D1 is provided for the user I.

For example, the user I may request access to a resource of a different tenant (for example, a different document) while keeping the login status. In this case, the user I is permitted to access the resource as long as the login password of the user I satisfies a password policy of the different tenant to which the resource belongs. That is, if the strength of the password that the user I has used in the login authentication is equal to or higher than a strength defined in the password policy of the tenant requested for access from the user I, the user I is permitted to access the resource based on the password set at that time.

FIGS. 12A, 12B, and 12C illustrate the case in which the user I requests access to the document D2.

In the example illustrated in FIGS. 12A, 12B, and 12C, the user I requests access to "DOCUMENT D2" as the document ID. As illustrated in FIG. 12A, the document D2 is identified as belonging to a tenant B based on the tenant information 161. In this example, it is assumed that the user I requests access to the document D2 on Feb. 1, 2018.

The user I also belongs to the tenant B and has authority to access the document D2.

In this example, reference is made to the password policy information for the tenant B as illustrated in FIG. 12B. The password policy information 166 of the tenant B indicates that the minimum password length is "10", the password validity period is "infinity", the minimum number of upper-case letters included in the password is "0", the minimum number of lower-case letters included in the password is "0", and the minimum number of numerical digits included in the password is "0".

As illustrated in FIG. 12C, the strength information 521 of the password of the user I indicates that the password length is "8", the date of password change is "about 1 month ago", the number of upper-case letters included in the password is "2", the number of lower-case letters included in the password is "5", and the number of numerical digits included in the password is "1". That is, the strength information 521 of the user I satisfies the password policy of the tenant B except for the password length but the password length does not satisfy the password policy of the tenant B.

Thus, error information indicating that the password does not satisfy the password policy of the tenant B is displayed for the user I and the document D2 is not provided for the user I at least on this occasion.

When the user I desires to access the document D2 in the example described above, the user I performs processing for changing the password in the access control server 50. When the user I changes the password to a password that satisfies the password policy of the tenant B and requests access to the document D2 again, the user I is permitted to access the document D2.

<Exceptional Processing in Access Control>

The access control server 50 of the exemplary embodiment described above controls user's access to a resource based on strength information of a password set by the user and a set password policy.

Even if strength information of a user's password satisfies a password policy set in a tenant to which a resource belongs, the access control server 50 may limit access to the resource based on a predetermined condition.

For example, if an IP address of the client terminal 30 in the network 60 falls out of a predetermined IP address range though strength information satisfies a password policy, access to a resource is not permitted. In this manner, the access to the resource may be controlled while the environment of the user's access to the resource at the client terminal 30 is added to the conditions.

If a user accesses a resource after an elapse of a period longer than a predetermined period from previous access though strength information satisfies a password policy, the access to the resource is not permitted. In this manner, the access to the resource may be controlled while the usage of the resource by the user at the client terminal 30 is added to the conditions.

Even if strength information of a user's password does not satisfy a password policy set in a tenant to which a resource belongs, the access control server 50 may permit access to the resource based on a predetermined condition.

For example, if the IP address of the client terminal 30 that is used by a user in the network 60 falls within a predetermined IP address range as in a case in which the client terminal 30 accesses a resource within a specific company though strength information does not satisfy a password policy, the access to the resource may be permitted. In this manner, the access to the resource may be controlled while the environment of the user's access to the resource at the client terminal 30 is added to the conditions.

In this exemplary embodiment, different password policies are set in a plurality of tenants but may also be set for a plurality of resources belonging to a tenant. For example, it is assumed that a document D3 and a document D4 stored in the resource providing server 20 are accessible in the tenant A. In this case, a password policy for access to the document D3 and a password policy for access to the document D4 are set. The conditions of the password policy for access to the document D3 differ from the conditions of the password policy for access to the document D4.

With the configuration described above, the access in the tenant A may be controlled by setting different password policies for the plurality of resources that are the documents in the same tenant A.

The function to be executed by the access control server 50 may be substituted by, for example, a different server connected to the network 60. This exemplary embodiment is applicable to various systems in which the tenant management server 10 may manage users and licenses in each tenant.

The information processing system 1 of this exemplary embodiment is not limited to the system in which a plurality of tenants are managed but is also applicable to, for example, a different system in which user's access to a plurality of resources is controlled by performing a single operation of user authentication.

This exemplary embodiment is described taking the example in which a user is authenticated by using a password but is not limited to this example. For example, the user may be authenticated by using so-called biological information such as a user's face, fingerprint, or vein. Also in the case of using the biological information, pieces of password policy information indicating different strengths may be set based on, for example, a condition related to recognition of the biological information, a condition related to a combination of a plurality of pieces of biological information, or a condition related to a combination of a password and the biological information.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus, comprising:
a storage device, configured to store an authenticator, a tenant identification part, an acquirer and a controller;
a processor, configured to execute the authenticator, the tenant identification part, the acquirer and the controller, wherein
the authenticator receives authentication information of a user and sends the received authentication information to a tenant management server, such that the tenant management server decides whether to permit the user to log in, wherein the tenant management server is configured to provide a tenant information indicating which tenant each user belongs to;
the tenant identification part, by referring to the tenant information in the tenant management server, identifies a tenant to which one of a plurality of resources that is requested to access from the user on a network belongs after permitting the user to log in;
the acquirer acquires password policy information of the identified tenant, wherein the password policy information is related to a strength of authentication information; and
the controller determines whether strength information of the authentication information satisfies the password policy information, permits to access the one resource requested from the user in response to the strength information of the authentication information satisfies the password policy information, and does not permit to access the one resource requested from the user in response to the strength information of the authentication information does not satisfy the password policy information,
wherein the storage device further comprises a notifier that notifies the user of details of the password policy information when the user accesses the one resource and when the strength information does not satisfy the password policy information.

2. The information processing apparatus according to claim 1, wherein the storage device further comprises a manager that manages a plurality of elements in each of which access authority of the user is set for at least one resource, wherein the tenant corresponding to one resource requested is one of the elements, wherein the controller is configured to control access to the at least one resource based on the password policy information that is related to the strength and is provided for each of the elements.

3. The information processing apparatus according to claim 2, wherein the manager manages the elements to each of which the plurality of resources having different password policy information related to the strength belong.

4. The information processing apparatus according to claim 1, wherein the storage device further comprises a strength information memory that stores the strength information extracted from the authentication information when the user is authenticated by the authenticator.

5. The information processing apparatus according to claim 4, wherein the strength information comprises at least one of the number of letters in a character string that constructs the authentication information or a validity period of the authentication information.

6. The information processing apparatus according to claim 1, wherein the controller controls the access to the one resource based on a different condition in addition to the strength information and the password policy information.

7. The information processing apparatus according to claim 6, wherein the controller limits the access to the one resource based on the different condition though the strength information satisfies the password policy information.

8. The information processing apparatus according to claim 6, wherein the controller permits the access to the one resource based on the different condition though the strength information does not satisfy the password policy information.

9. An information processing system, comprising:
a storage device, configured to store an authenticator, a memory and a controller;
a processor, configured to execute the authenticator, the memory and the controller, wherein
the authenticator receives authentication information of a user and sends the received authentication information to a tenant management server, such that the tenant management server decide whether to permit the user to log in, wherein the tenant management server is configured to provide a tenant information indicating which tenant each user belongs to;
the memory stores a plurality of password policy information of plurality of tenants corresponding to conditions that are related to a strength of authentication information and are provided differently for respective resources; and
the controller, by referring to the tenant information in the tenant management server, identifies one of the tenants to which one of the resources that is requested to access from the user on a network belongs after permitting the user to log in, acquires the password policy information corresponding to the identified tenant, determines whether strength information of the authentication information satisfies the password policy information corresponding to the identified tenant, permits to access the one resource requested from the user in response to the strength information of the authentication information satisfies the password policy information, and does not permit to access the one resource requested from the user in response to the strength information of the authentication information does not satisfy the password policy information,
wherein the storage device further comprises a notifier that notifies the user of details of the password policy information when the user accesses the one resource and when the strength information does not satisfy the password policy information.

10. A non-transitory computer readable medium storing a program causing a computer to execute a process comprising:
receiving authentication information of a user and sends the received authentication information to a tenant management server, such that the tenant management server decide whether to permit the user to log in, wherein the tenant management server is configured to provide a tenant information indicating which tenant each user belongs to;
by referring to the tenant information in the tenant management server, identifying a tenant to which one of a plurality of resources that is requested to access from the user on a network belongs after permitting the user to log in;
acquiring password policy information of the identified tenant, wherein the password policy information is related to a strength of authentication information; and
determining whether strength information of the authentication information satisfies the password policy information;
permitting to access the one resource requested from the user in response to the strength information of the authentication information satisfies the password policy information;
not permitting to access the one resource requested from the user in response to the strength information of the authentication information does not satisfy the password policy information; and
notifying the user of details of the password policy information when the user accesses the one resource and when the strength information does not satisfy the password policy information.

* * * * *